May 12, 1959  H. A. STRAHAN  2,886,305
CUTTING TORCH CARRIAGE
Filed March 25, 1957  2 Sheets-Sheet 1
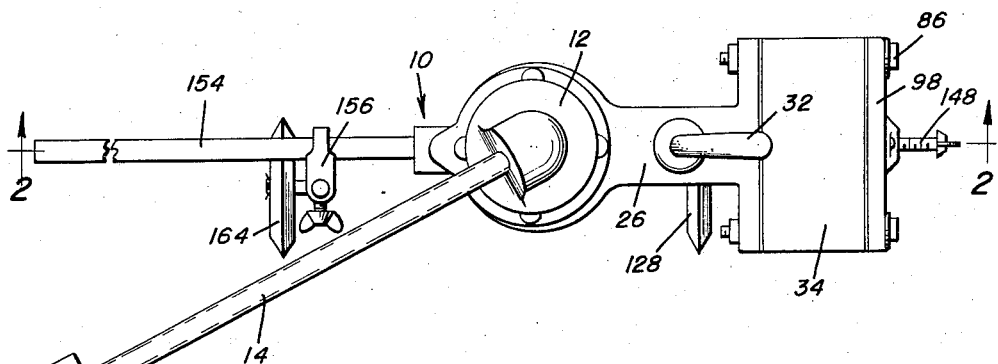
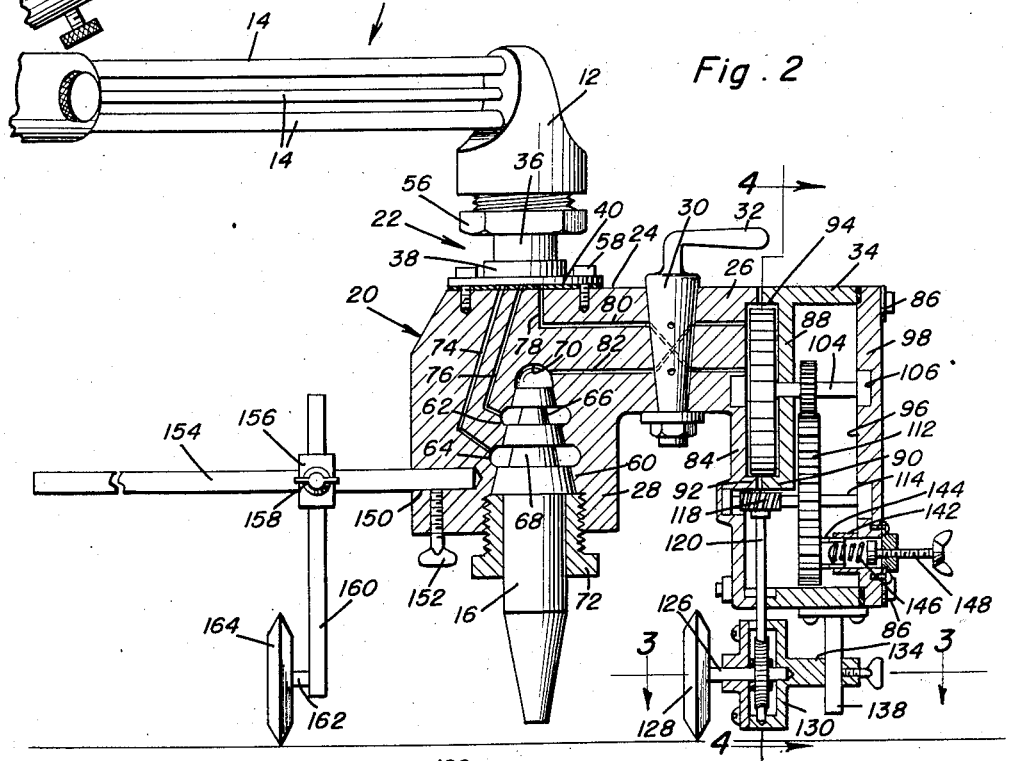
Heaston A. Strahan
INVENTOR.

May 12, 1959  H. A. STRAHAN  2,886,305
CUTTING TORCH CARRIAGE
Filed March 25, 1957  2 Sheets-Sheet 2

Heaston A. Strahan
INVENTOR.

BY
Attorneys

United States Patent Office 2,886,305
Patented May 12, 1959

2,886,305

CUTTING TORCH CARRIAGE

Heaston A. Strahan, Oregon City, Oreg.

Application March 25, 1957, Serial No. 648,339

1 Claim. (Cl. 266—23)

This invention comprises a novel and useful cutting torch carriage and more particularly relates to an apparatus wherein the compressed oxygen supplied to the nozzle of a cutting torch may be utilized as a power means to assist in moving the cutting torch during its cutting operation.

The primary object of this invention is to provide a device which may be readily applied to conventional cutting torches for using the power residing in the compressed oxygen supplied to the torch as a means to assist the operator in moving the torch during its cutting operation.

A further object of the invention is to provide an apparatus in accordance with the foregoing object which can be readily attached and applied to existing cutting torches in order to provide a power moving means for the same.

A still further important object of the invention is to provide an attachment in accordance with the preceding objects which will enable the ready adjustment of the nozzle of the torch from the surface being cut by the torch without in any way interfering with the power driving means for moving the torch.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view showing a portion of a cutting torch to which the present invention has been applied, parts being broken away;

Figure 2 is a vertical longitudinal sectional view taken substantially upon the plane indicated by the section line 2—2 of Figure 1, parts being shown in elevation and parts being broken away, and illustrating some of the oxygen and acetylene passages in the device together with the compressed oxygen power operating means for the torch;

Figure 3 is a horizontal sectional detail view taken substantially upon the plane indicated by the section line 3—3 of Figure 2 and showing the manner in which the supporting and driving wheel of the carriage of the torch assembly is mounted for vertical adjustment and is connected to the gearing of the power operating means;

Figure 4:
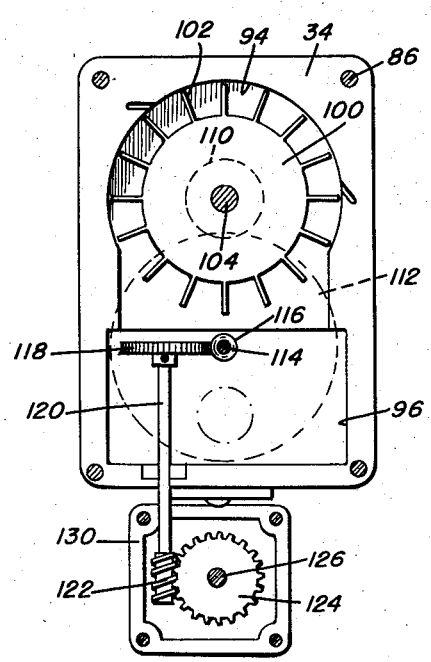
Figure 4 is a vertical transverse sectional detail view taken upon an enlarged scale substantially upon the plane indicated by the section line 4—4 of Figure 2 and showing more clearly the manner in which the gearing is applied to the air motor and the axle of the supporting and driving wheel of the torch carriage.

Referring first to Figures 1 and 2, it will be seen that the numeral 10 designates generally a portion of a conventional torch assembly having a head 12 thereon to which the conduits 14 are connected whereby acetylene and compressed oxygen are supplied to a cutting nozzle 16 of the torch in a conventional manner. In the conventional torch, the nozzle 16 is directly attached to the cutting head 12 for receiving the supply of oxygen and acetylene. In the present invention however a carriage designated generally by the numeral 20 is secured to the head 12 by an adapter unit indicated generally by the numeral 22, in place of the torch nozzle 16, the latter being instead connected to the carriage unit 20 in a manner to be subsequently set forth. With the carriage unit 20 applied to the head 12, and carrying the torch nozzle 16, the conventional torch is modified or converted whereby as set forth hereinafter the nozzle may be readily moved across the surface to be cut by the torch either manually by the operator or automatically, under the influence of power derived from the pressure of the compressed oxygen supplied to the torch.

Referring first to Figure 2 it will be seen that the carriage 20 consists of a body having a flat upper surface 24, a laterally projecting portion 26 and a depending lower portion 28.

A manually controlled tapering valve 30 having a handle 32 extends vertically through the laterally projecting portion 26 of the carriage for a purpose to be subsequently set forth. At the outer end of the laterally projecting portion 26 there is secured a casing 34 for a purpose to be subsequently apparent.

Figure 6:
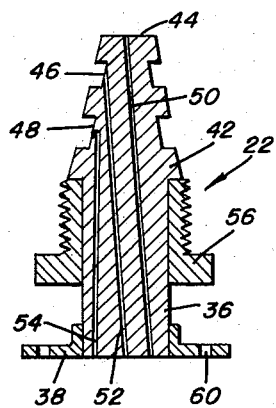
Figure 6 is a view in vertical section through an adapter or conversion unit by which the carriage of this invention is mounted upon a conventional torch assembly.
Figure 8:
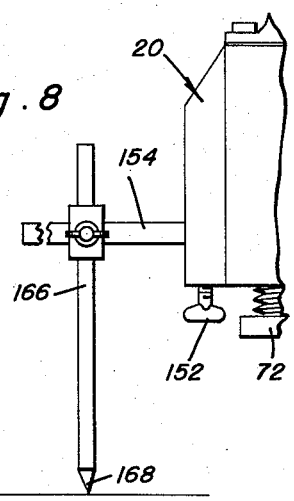
Figure 8 is a fragmentary view in elevation, parts being broken away, of an attachment which may be employed with the torch carriage to adapt the torch to cutting circles.
Figure 7:
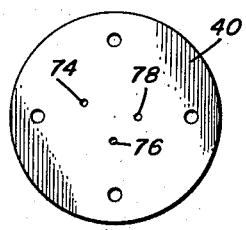
Figure 7 is a bottom plan view of a portion of the invention.

Referring now particularly to Figure 6, it will be seen that the adapter unit 22 consists of a cylindrical body 36 having a flange 38 soldered or otherwise fixedly secured to its lower end, the body and flange having a flat plane lower surface adapted to rest upon the top surface 24 of the carriage 20, a suitable gasket 40 being interposed therebetween. At its upper portion the body 36 is provided with a diametrically enlarged rib or shoulder 42 and from the shoulder the body is upwardly and inwardly tapering in a conical configuration, terminating in a flat top portion 44. Annular circumferential grooves 46 and 48 are formed in the conical surface of the upwardly tapering portion of the body, and passageways 50, 52 and 54 open upon the bottom surface of the body 36, extend upwardly through the same, and have their upper ends terminating respectively upon the top surface 44, and in the grooves 46 and 48. Surrounding the body 36 and abutting the underside of the shoulder 42 is a threaded gland or packing nut 56. The arrangement is such that the torch nozzle 16 may be removed from the head 12, and the adapter unit 22 may be inserted in the head in place of the nozzle, it being understood that the upper portion of the body 36 is of the same shape and configuration as that of the nozzle which it is adapted to replace.

By means of suitable fasteners 58 which extend through apertures 60 in the flange 38 at the bottom of the adapter unit, the latter may be rigidly attached to the top surface 24 of the carriage 20. By means of the threaded bushing or gland 56, the carriage in turn may be secured to the lower side of the torch head 12. It will be understood that when so secured, the passages 50, 52 and 54 will selectively register with the conduits 14 by which the compressed oxygen and acetylene are supplied to the head and from the head to the nozzle of the torch.

The carriage is provided with passages therein which in turn register with the passages 50, 52 and 54 of the adapter unit 22 for supplying acetylene and oxygen to the torch nozzle 16. This construction is as follows.

The downwardly projecting portion 28 of the carriage is provided with an upwardly extending bore designated generally by the numeral 60. This bore is of the same shape and size as the conventional nozzle receiving bore in the head 12, whereby the torch nozzle 16 may be inserted in the bore 60 in place of its previous insertion in the head 12.

The bore 60 is provided with annular grooves or passages 62 and 64, registering with the corresponding annular grooves or passages 66 and 68 upon the exterior of the upper tapered portion of the nozzle 16, it being now understood that the annular grooves 66 and 68 on the nozzle 16 are identical with the grooves 46 and 48 on the conversion unit 22.

It is understood that the conventional torch nozzle 16 has therein passages similar to the passages 50, 52 and 54 of the conversion unit 22, and which register with a cavity 70 at the upper end of the bore 60, and with the annular channels 62 and 64 in the bore 60.

A threaded bushing or packing gland 72 serves to removably secure the torch nozzle 16 in the bore 60, with the aforementioned channels and passages in proper registration with those in the carriage.

Referring now more closely to Figure 2 it will be seen that there is provided a pair of passages 74 and 76 in the body extending downwardly into the depending portion 28 thereof, which passages respectively register with the adapter unit passages 52 and 54, and with the annular channels 62 and 64. These two passages serve to supply acetylene and oxygen to the torch nozzle 16 for the purpose of preheating the work to be cut by the torch. There is provided a further vertical passage 78 in the upper portion of the carriage 20 which communicates with the lower end of the passage 50 and which receives the high pressure compressed oxygen which is normally supplied to the nozzle of the torch for cutting purposes. At its lower end, the passage 78 communicates with a horizontally extending passage 80, while a similar horizontal passage 82 extends from the cavity 70 in the upper end of the bore 60. The passages 80 and 82 are intercepted by the manually operated valve 30, and at their outer ends extend into the casing 34 previously mentioned.

Depending from the outer portion of the laterally projecting portion 26 is a substantially vertical plate-like member 84 which cooperates with the casing 34, the latter being secured to the portion 26 and the member 84 as by fastening bolts 86. Formed in the casing 34 is a partition member 88 parallel to the plate-like member 84, and from which extends a horizontal wall 90 cooperating with a corresponding laterally projecting wall 92 at the lower end of the member 84. The partition or plate-like member 84 and the casing thus serve to provide a relatively small and narrow pump chamber 94 and a relatively larger gearing assembly housing or chamber 96. An end wall or closure plate 98 is provided for the gearing chamber, this plate being held in place by the above mentioned fasteners 86.

Figure 5:
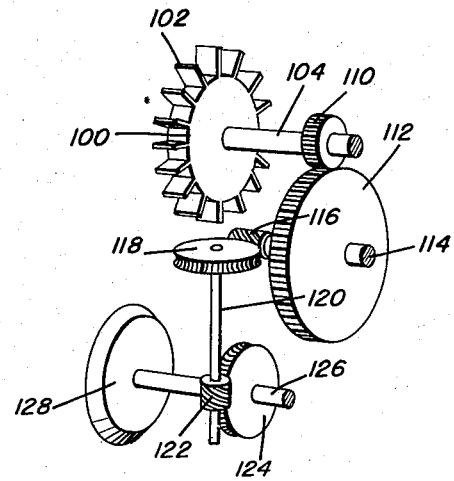
Figure 5 is a somewhat diagrammatic perspective view showing the gearing assembly for connecting the air motor to the support and drive wheel.

Referring now especially to Figures 2, 4 and 5, it will be seen that a turbine-type rotor 100 having impeller vanes 102 thereon is carried by a shaft 104. The rotor is received in the chamber 94, while the axle or shaft 104 is journaled in the partition 88 and in a bearing recess 106 in the end wall or closure plate 98. The arrangement is such that when the valve 30 is disposed in proper position, the compressed oxygen from the passage 80 will enter the motor chamber 94, will pass through this chamber causing rotation of the rotor 100, and will emerge from this chamber through discharge passage 82, being delivered by the latter to the cavity 70, and then into the cutting oxygen passage in the nozzle 16. Thus, with the valve in this position, the compressed oxygen serves to impart rotation to the shaft 104 before being delivered to the appropriate passage of the torch nozzle 16 for cutting operations by the torch.

However, the valve 30 may be reversed and by a set of cross over passages in the valve, the oxygen may be delivered to the rotor but caused to pass through the chamber 94 in a reverse direction thus reversing the direction of rotation of the shaft 104 for a purpose to be subsequently set forth, and then being again discharged through the nozzle 16. It will of course be understood that the valve may be disposed in an intermediate position cutting off all flow through the rotor chamber 94 and causing the passage 80 to be directly connected to the passage 82.

It will be observed that the axle or shaft 104 has a gear 110 secured thereon. This gear constitutes part of a gearing assembly by means of which the rotor 100 is employed to impart movement to the carriage and the torch nozzle. This gearing assembly includes a gear 112 carried by the shaft 114 and which shaft in turn is provided with a worm gear 116 which in turn meshes with the gear 118 carried by a vertical shaft 120. The latter shaft at its upper end is journaled in the partitions 90, 92, and at its lower end is journaled in the bottom walls of the casing 34 and of the inturned wall at the lower end of the plate-like member 84 as will be apparent from Figure 2. At its lower portion the shaft 120 has thereon a worm gear 122 which is operatively engaged with a gear 124 carried by the axle 126. Secured to this axle is a support and drive wheel 128 by which the carriage 20 is supported and may be readily moved either manually by the operator or through the power applied from the turbine rotor 100 through the above mentioned gearing assembly.

The last mentioned worm gear 122 is keyed or otherwise secured to the vertical shaft 120 for vertical sliding movement thereon. For this purpose, it will be observed as shown in Figure 3 that the shaft 126 is journaled in a housing or casing 130 having a cover plate 132. From the housing 130 projects a lateral arm 134 having a vertical passage 136 therethrough which is square in cross section and which slidably receives a depending member 138 of the same cross sectional shape. A thumb screw 140 serves to lock the arm 134 and consequently the housing 130 upon the member 138 in various vertical adjusted positions thereon, carrying with this housing the support and drive wheel 128, the gear 124, the shaft 126 and the worm gear 122, the latter sliding upon its driving shaft 120. It will thus be apparent that the support and drive wheel 128 can be readily vertically adjusted with respect to the torch nozzle 16 whereby to position the latter at a selected distance above the surface to be cut. It will be further seen that during this vertical adjustment of the nozzle with respect to the surface, that the gearing connection between the turbine rotor 100 and the support and drive wheel will not be interrupted.

An adjustable brake means is provided whereby to limit and regulate the rate of movement of the support and drive wheel 128 and consequently the rate of travel of the torch over the surface which it is cutting. For this purpose there is provided a cylinder 142 formed upon the inner surface of the closure plate or end wall 98, and a plunger 144 is slidably received in the inner end of this cylinder, having a suitable friction surface engaging a side of the previously mentioned gear 112. Received in this cylinder is a compression spring 146 bearing against the plunger, and a manual adjusting rod 148 is provided for varying the compression of the spring and consequently the force with which the plunger is pressed against the gear 112. Thus, the frictional resistance imparted to the movement of the gear can be readily adjusted to thereby control the speed imparted to the support and drive wheel 128 through the gearing assembly.

As further shown in Figure 1, there is provided, opposite the casing 34, a horizontally extending bore 150 in the depending portion 28 of the carriage. By means of a thumb screw 152, a laterally projecting rod 154 may be secured in this bore. A carriage 156 is slidably received upon this rod, being retained in a horizontally adjusted position thereon as by a thumb screw 158, and this carriage in turn carries a vertical rod 160, whose lower end has a laterally projecting axle 162 upon which a support roller 164 is journaled. It will thus be seen that the support roller 164 may likewise be vertically adjusted by means of the thumb screw 158, and may be horizontally adjusted upon the rod 154 by means of this same thumb screw.

By the means above described it is therefore apparent that the carriage is carried by a supporting roller 164 and by the supporting and driving roller 128, which rollers may be readily adjusted in order to vary the distance of the nozzle 16 from the surface being cut.

In some instances, it may be preferred to replace the rod 160, axle 162 and roller 164 by means of a rod 166, having a pointed lower end 168. This will enable the rod to be engaged in a punch hole in the surface to be cut whereupon the carriage will automatically revolve in a circle about the rod 166 and cut a circular slot in the surface being cut by the torch.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A cutting torch assembly comprising a carriage, means for mounting said carriage upon a cutting torch head, means for mounting a cutting torch nozzle on said carriage, means for supporting said carriage with said nozzle at a constant distance from an article to be cut thereby, said supporting means including a support and drive roller, a fluid pressure turbine rotatably carried by said carriage, gearing connecting said turbine to said support and drive roller, supply passages in said carriage connected with said head and said nozzle for supplying gases to said nozzle from said head, branch passages in said carriage operatively connected with one of said supply passages for delivering fluid from said head to said turbine and from the latter to said nozzle whereby the pressure of a fluid supplied to the nozzle is utilized for effecting movement of said carriage and nozzle, a reversing valve in said branch passages whereby the direction of rotation of said turbine may be reversed, a gear casing on said carriage and depending therefrom and enclosing said gearing, a vertical shaft driven by said gearing and extending beneath said casing, said support and drive roller including an axle, a second casing journaling said axle and receiving said vertical shaft, connecting means between said axle and said vertical shaft in said second casing, means mounting said second casing on said gear casing, said mounting means comprising a member depending from said gear casing, said second casing have a bore slidably receiving said member, adjusting means for securing said second casing to said member in vertically adjusted position.

References Cited in the file of this patent

UNITED STATES PATENTS

| | | |
|---|---|---|
| 433,184 | Pickles | July 29, 1890 |
| 1,285,822 | Smith | Nov. 26, 1918 |
| 1,379,360 | Pickering | May 24, 1921 |

FOREIGN PATENTS

| | | |
|---|---|---|
| 469,577 | Germany | Sept. 13, 1929 |
| 299,166 | Great Britain | Oct. 25, 1928 |
| 381,145 | Great Britain | Sept. 27, 1932 |
| 605,514 | Great Britain | July 26, 1948 |